United States Patent [19]
Hanson

[11] Patent Number: 5,373,497
[45] Date of Patent: Dec. 13, 1994

[54] COMPACT DISC WITH SYNCHRONIZING HEADER

[75] Inventor: Joe L. Hanson, Birmingham, Ala.

[73] Assignee: Sonics Associates, Incorporated, Birmingham, Ala.

[21] Appl. No.: 827,590

[22] Filed: Jan. 29, 1992

Related U.S. Application Data

[62] Division of Ser. No. 459,631, Jan. 2, 1990, Pat. No. 5,132,955.

[51] Int. Cl.$^5$ .......................... G11B 7/26; G11B 5/09
[52] U.S. Cl. .................................. 369/275.1; 369/49; 369/275.3; 370/105.4; 370/105.1; 370/106; 360/48; 360/49
[58] Field of Search .................... 369/49, 85, 34, 39, 369/32, 43, 44.25, 44.28, 54, 275.1, 275.3, 50; 360/72.2, 49, 27, 48, 73.11; 370/105.4, 105.1, 106, 114

[56] References Cited

U.S. PATENT DOCUMENTS

| | | | |
|---|---|---|---|
| 4,727,530 | 2/1988 | Tomisawa | 369/50 |
| 4,893,193 | 1/1990 | Nakamura et al. | 369/49 |
| 4,953,153 | 8/1990 | Suzuki | 369/49 |
| 4,967,403 | 10/1990 | Ogawa et al. | 369/44.26 |
| 4,996,679 | 2/1991 | Yoshio | 369/47 |
| 5,132,955 | 7/1992 | Hanson | 369/49 |
| 5,140,570 | 8/1992 | Nagasawa et al. | 369/32 |
| 5,226,046 | 7/1993 | Hanson | 369/49 |

Primary Examiner—Paul M. Dzierzynski
Assistant Examiner—Kim-Kwok Chu
Attorney, Agent, or Firm—Ross, Howison, Clapp & Korn

[57] ABSTRACT

A synchronization system for multiple CD players (12), (14), (16) and (18) includes a controller (20) that generates four separate sampling frequencies for input to the word clock inputs of the CD players. A master word clock provides a master clock signal that is input to CD player (12) and then multiplied by multiplier (40). The output of multiplier (40) is divided down by variable dividers (48), (50) and (52) to provide the sampling frequencies for the remaining CD players (14), (16), and (18). Each of the disks (54) has a header (80) disposed on the beginning of each of the program tracks. This header has a unique synchronization signal associated therewith that outputs data corresponding to the position of the output digital data. During output of the data associated with the header, a difference between positions of the different CD players is determined. This difference is stored in the controller (20) and then the divide ratios of each of the dividers (48), (50) and (52) adjusted to change the sampling frequency on the output thereof, resulting in a slipping of samples, until the difference between the sample frames of each of the CD players is set equal to zero.

3 Claims, 6 Drawing Sheets

COMPACT DISC WITH SYNCHRONIZING HEADER

This application is a Division of application Ser. No. 07/459,631, filed Jan. 2, 1990, now U.S. Pat. No. 5,132,955.

TECHNICAL FIELD OF THE INVENTION

The present invention pertains in general to synchronizing systems and, more particularly, to a synchronizing system for allowing multiple CD players to output data in a synchronized manner.

BACKGROUND OF THE INVENTION

Audio storage and reproduction in recent years has been dominated by the digital audio medium which typically utilizes a laser scanned Compact Disc (CD) player. The CD player utilizes a disc upon which digital audio information is encoded in a predetermined format, which format can then be read by a laser. The digital data is organized in spiralling tracks on the surface of the disc, somewhat similar to a conventional phonograph record. This digital data is organized in sequentially generated sample frames, each sample frame containing both audio information and sample position information. The CD player is therefore operable to provide general information as to relative location on the disc of each sample frame such that it is possible to electronically relocate the scanning device to a particular location on the disc.

All data on a CD is formatted by frame; by definition a frame is the smallest complete section of recognizable data on a disc. Each frame contains a 24 bit synchronization word plus three merging bits, eight bits of unmodulated subcode, six sixteen-bit audio words, thirty two bits of parity, six sixteen-bit audio words and thirty two bits of parity. These unmodulated bits are eight-to-fourteen modulated (EFM), interleaved, and combined with merging bits and the 27 bit synchronization word for a total of 588 bits per frame. Since each 588 bit frame contains 12 sixteen bit audio samples, the result is 49 channel bits per audio sample. The frames are disposed on spiralling tracks which are adjacent to each other and separated by approximately 1.6 micrometers. The data is encoded by disposing selectively spaced and sized pits in the surface of the disc, which pits are then scanned with a laser while the disc is rotating. Unlike an analog recording on a typical phonograph record, the data is read from a given track at a rate corresponding to the speed with which the track passes the scanning element. If the disc were to rotate at a given speed, this would mean that data would come off at a faster rate proximate to the peripheral edge of the disc as compared to the center portion of the disc. This data is typically placed into a first-in first-out (FIFO) buffer and the speed of the disc controlled to ensure that the buffer does not overflow or underflow. Thereafter, a sampling clock is provided to read the information from the FIFO at a predetermined output rate. This is typically controlled by a word clock.

When recording data for multiple channels such as stereo, quadraphonic, etc. applications, it is necessary that the phase of the different channels be synchronized to ensure that the audio is properly reproduced. It can be appreciated that as long as data is recorded onto the same CD, this can be easily achieved since there is one word clock and a common speed for all tracks on a given disc. Therefore, a single disc facilitates multiple channel recording. However, as the number of channels increases, the amount of data per channel that can be recorded decreases, since the disc has a standard and finite size.

In order to provide long playing audio programs with multiple channels, it is necessary to utilize more than one CD player, thus requiring multiple discs. Of course, this now requires multiple word clocks and multiple rotating mechanisms. The word clocks for the multiple players can be synchronized since some CD players provide an external input for the word clock, which word clock can therefore be common to all players. However, there is no common link between each of the CD players to ensure that the samples are properly aligned.

Sample alignment typically requires that the audio samples, when compared side-by-side between the channels, be output in the same sequence from the beginning of the audio program. For example, if there were two thousand samples in an audio program, it is important that the one thousandth sample in the first channel be output at substantially the same time as the one thousandth sample in the nth channel is output. Any misalignment in the samples will be noticed. Although subcode that is embedded in each of the sample frames contains information about its general location in a particular program, synchronizing to this information can result in a substantial amount of jitter. This is due to the fact that the subcode data is output from the digital data stream on a separate path from that on which the audio data is flowing. The processing for both paths can differ by as much as ±3 milliseconds. This would be unacceptable for high quality audio reproduction with multiple channels.

In view of the above disadvantages and limitations of CD systems, it is desirable to provide a system that will allow multiple CD players to be synchronized on a sample by sample basis.

SUMMARY OF THE INVENTION

The present invention disclosed and claimed herein comprises a method for synchronizing two digital data streams that have a finite length. Each of the data streams has contained therein sample frames which are sequentially generated from a first sample frame to an nth sample frame. A unique synchronization section is provided in each of the digital data streams that contains at least one sample. The data contained in the at least one sample defines the relative sample position of the at least one sample. Each of the digital data streams has a sampling clock associated therewith with the sample frames synchronized thereto. The data in the sampling frames is sampled at the clock rate of the associated sampling clock to output the digital data contained in each of the sampling frames. Detection circuitry is provided for detecting the presence of the synchronization section and determining its sample position such that thereafter, the sample position of each one of the sampled positions is known. The difference between the sampled position and the output data is then determined between all of the digital data streams. This difference is adjusted to a predetermined difference by adjusting the frequency of the sampling clocks.

In another aspect of the present invention, each of the synchronization sections includes a plurality of sample frames. The synchronization sections are disposed at the beginning of the digital data streams such that when sampling is initiated the first data to appear is that contained in the synchronization section. The synchronization section has the data associated therewith arranged as a predetermined sequence of values with each value correlating to the sample position of the associated sample frame. The difference between the sequencing values in the synchronization sections is then determined as they are sampled, and this difference corresponds to the difference between the sample positions in the digital data streams.

In yet another aspect of the present invention, each of the sampling clocks is generated off of a master clock. The master clock has the frequency thereof divided down by a variable divide ratio to provide the sampling clocks. A separate divide ratio is provided for each of the sampling clocks. Variation of this divide ratio provides an adjustment to the frequency thereof relative to the master clock. The sampling clocks are adjusted upward or downward to vary the difference between the sampling position, and then are returned to a common divide ratio that is common to all of the sampling clocks. In the preferred embodiment, the difference between the sampling positions is set to zero.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
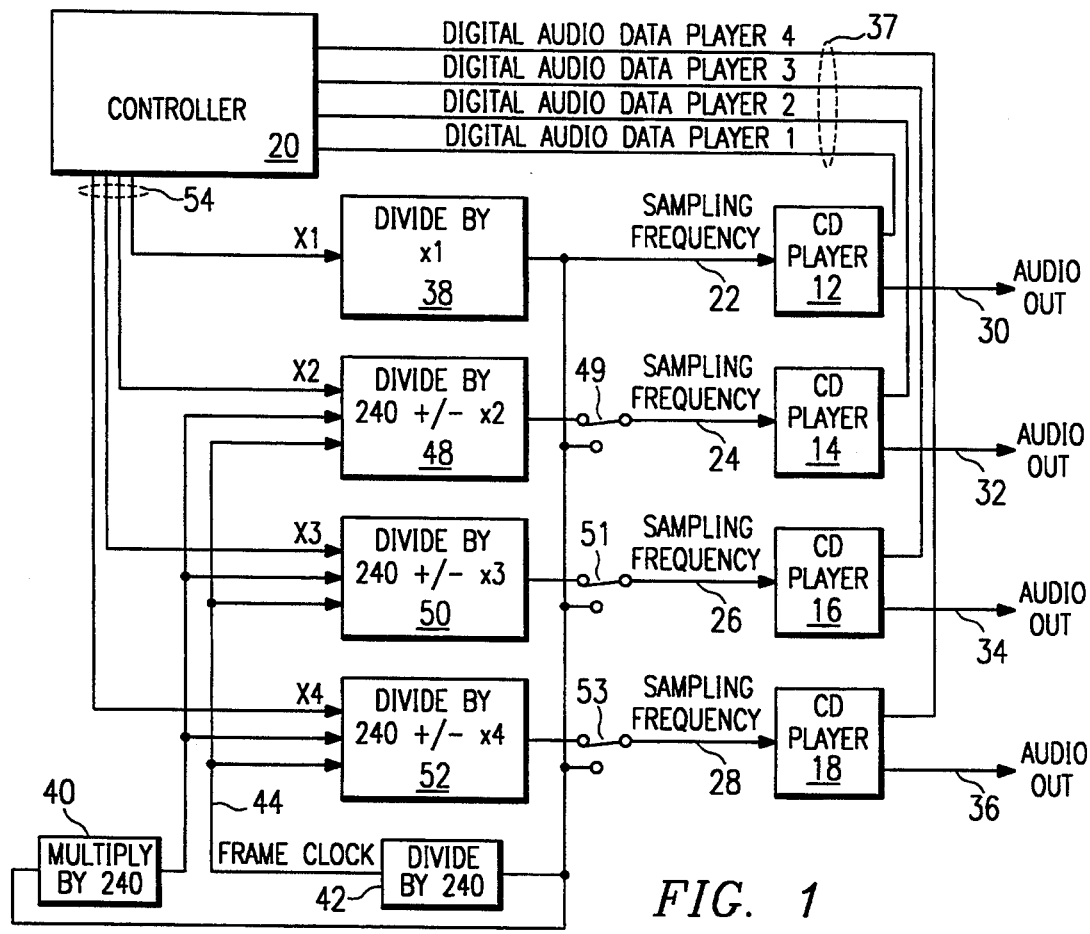
FIG. 1 illustrates the block diagram of the synchronization system for multiple CD players.

Referring now to FIG. 1, there is illustrated a schematic block diagram of four CD players 12, 14, 16 and 18 which are synchronized together with a controller 20. Each of the CD players 12–18 has a separate clock input connected to a separate sampling frequency line 22, 24, 26 and 28, respectively, to provide the word clock for the respective one of the CD players 12–18. In addition, each of the CD players 12–18 provide an audio output on respective output lines 30, 32, 34 and 36. A corresponding digital audio output is provided on separate digital lines 37, one digital line for each of the CD players 12–18. Although illustrated as a single audio output, the audio is typically output on two channels such that four CD players will provide eight channels of operation.

Each of the CD players 12–18 has a separate drive motor that is independently controlled by the respective one of the CD players 12–18. The word clock input from the lines 22–28 provide the timing reference from which the speed of the motor is determined, the rate at which the frames of data are processed through the CD player, etc. A high resolution clock is generated in the controller 20 which is operable to output a frequency of 44.1 kHz. This is input to a divide-by-X1 circuit 38, the output of which provides the sampling frequency to the CD player 12 as the word clock input on sampling frequency line 22. The output of the divide-by-X1 circuit 38 is input to a multiplication circuit 40 to multiply the 44.1 kHz frequency by a factor of 240 and output a clock frequency of 10.584 MHz. The output of the divide-by-X1 circuit 38 is also input to a divider 42 to divide the 44.1 kHz frequency by a factor of 240 to provide on an output line 44 a frame clock.

The output of the multiplication circuit is input to each of three separate divide-by-N dividers 48, 50 and 52, the outputs of which are connected to the respective sampling frequency lines 24, 26 and 28. The sampling frequency nominally operates at a frequency of 44.1 kHz. Each of the divide-by-N dividers 48–52 also receives the frame clock input from the output 44 and also receives an input from the controller 20 on one of four separate lines 54, lines 54 representing various timing and control signals. In addition, the controller 20 receives the digital audio data lines 37 from the output of the CD players 12–18.

In operation, the digital data is read and decoded by the CD players 12–18 and then input to the controller 20 prior to conversion to an analog output on lines 30–36. This digital data is comprised of digital subcode data and digital audio data. As will be described in more detail hereinbelow, a header is provided at the beginning of each track, which header provides synchronizing information. With this synchronizing information, the value of N for each of the divide-by-N dividers 48–52 is controlled by controller 20 to "sample align" the audio tracks. By varying the sampling frequency on the word clock input to each of the CD players 14–18, it is possible to slow down or speed up the respective CD player on the output to align the samples in the various tracks with the CD player 12.

Sample aligning refers to the process whereby the absolute value of the samples are aligned, with the absolute value incrementing from a value of zero at the beginning of the track to a maximum at the end of the track. Since a single clock is referenced on the input to the CD player 12, the sample frames are synchronized and phase aligned, and with the use of the controller 20, they can then be sample aligned. With the system of the present invention, it can therefore be assured that given samples occur with a pre-determined relationship to each other, this pre-determined relationship in the preferred embodiment being perfectly aligned with no offset. However, it should be understood that the controller 20 could provide a pre-determined amount of offset between samples in the various channels, which is also an important aspect of the present invention.

Three series switches 49, 51, and 53 are provided in sampling frequency lines 24–28, respectively. The switches 49–53 are operable in a sample alignment mode to connect the word clock input of the respective CD player 14–18 to the output of the associated divider 48–52. Once the samples are aligned, the switches 49–53 connect the associated word clock input to the output of the divide-by-X1 circuit 38 to provide a single clock input. As will be described hereinbelow, this allows the controller to vary the single high resolution 44.1 kHz clock to accommodate synchronization with a projection system using signals received from the shaft encoder output.

Figure 2:
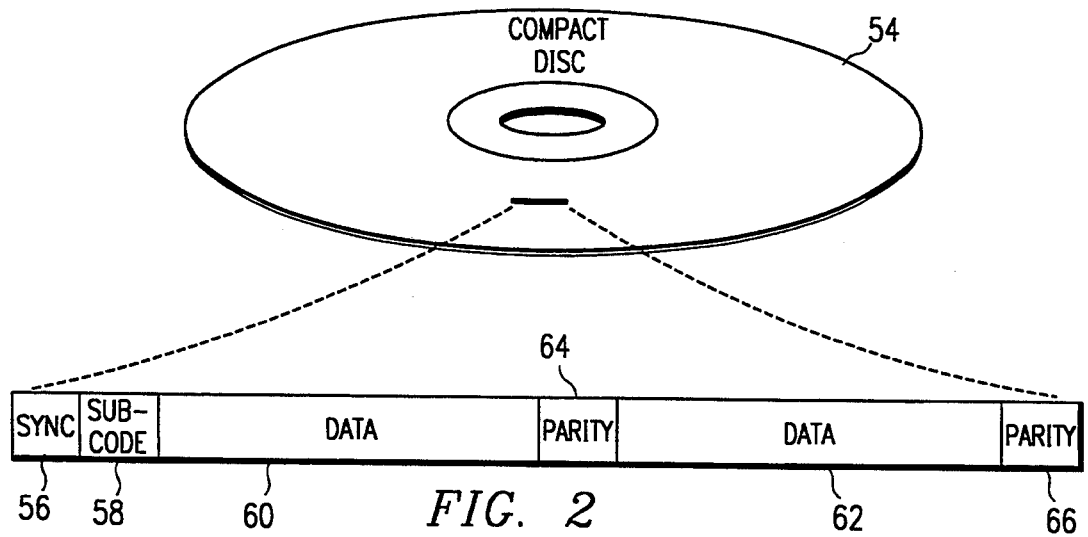
FIG. 2 illustrates a diagram of one frame of information on the compact disc.

Referring now to FIG. 2, there is illustrated a diagram of a given frame that is encoded on a track on the surface of a compact disc 54. Each frame has encoded therein the audio data, the associated parity, a synchronization word and the subcode. The first portion frame includes a twenty-seven bit synchronization word in a field 56. This is followed by eight bits of subcode in a field 58. This is followed by the audio data which occupies two fields 60 and 62, each of the fields 60 and 62 followed by parity bits in fields 64 and 66, respectively. The data field includes six sixteen bit audio data words and the parity fields 64 and 66 each include thirty two parity bits. This results in twelve sixteen-bit audio samples, six in each of the fields 60 and 62, a SYNC word in field 56, eight bits of subcode in field 58 and thirty two bits of parity in each of fields 64 and 66. As will be described herein, when this data is decoded, the audio is input to a buffer at a first rate and read out of the buffer at the word clock rate. The speed of the compact disc 54 is varied through a controller internal to the associated CD player to prevent the data from being read off the disc 54 at too fast a rate or too slow a rate to cause the buffer to overflow or underflow, respectively.

Figure 3:
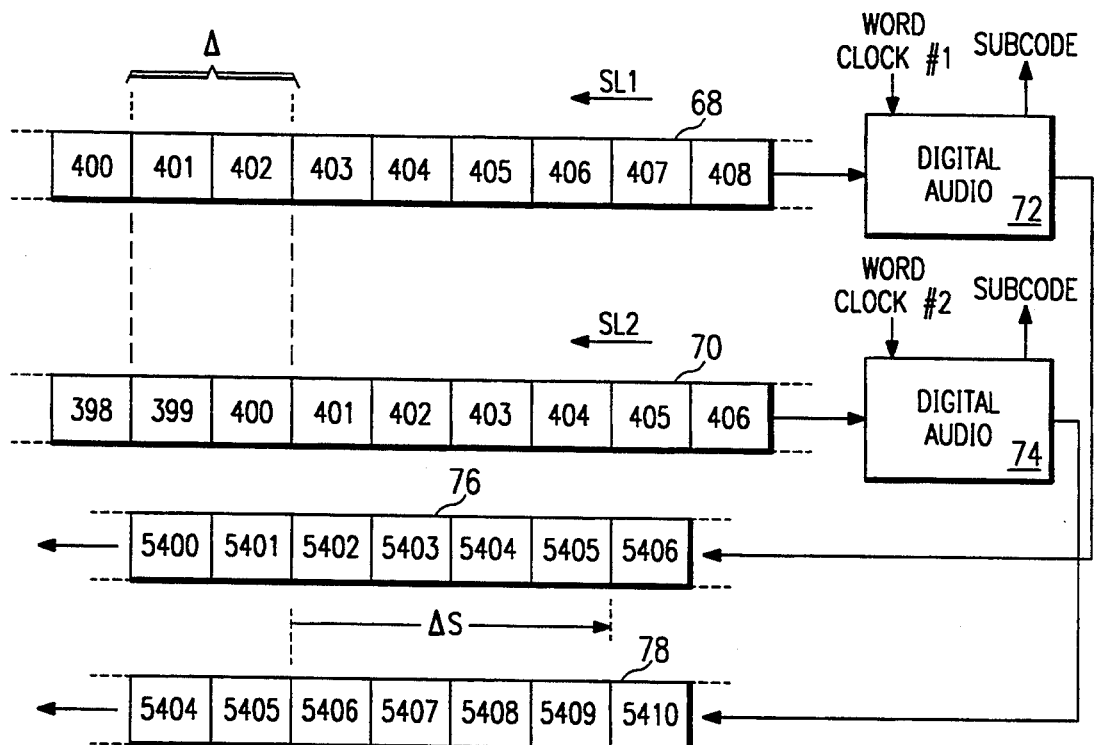
FIG. 3 illustrates a diagrammatic view of the sample frames on two adjacent CD players.

Referring now to FIG. 3, there is illustrated a diagram of two separate CD players illustrating only a single track on each CD player and the associated disc and the resultant output samples after decoding thereof. A section of a first track 68 is illustrated incorporating sample frames 400-408. A section of a second track 70 in a separate CD player is illustrated incorporating sample frames 398-406. The first track 68 operates at a speed SL1 and the second track 70 operates at a speed SL2. The speeds SL1 and SL2 are controlled by separate motors and separate controllers and, as described above, are varied in response to the controller maintaining a even data rate flow into the buffer. Each of the tracks 68 and 70 are scanned by a laser scanner and the digital output data streams, which are serial data streams, are input to digital audio circuits 72 and 74, respectively. The digital audio circuits 72 and 74 are operable to decode the modulated data and separate the digital audio data from the subcode information. This is a conventional processing element. However, during processing of the digital audio data and the subcode data, different decryption schemes are utilized with each decryption scheme utilizing a different amount and different type of error correction. Therefore, the subcode data and the audio data go through different paths. As such, knowledge of subcode data and information contained therein would not necessarily allow alignment of the decoded subcode data out of the digital audio circuits 72 and 74 to be aligned with the corresponding digital audio data sample that was in the associated frame. This is due to the fact that there exists approximately ±3 milliseconds of jitter between the two. Therefore, sample alignment utilizing subcode data would be unacceptable for high quality audio applications.

The output of the digital audio circuit 72 provides subcode data and also a digital audio data stream 76. In a similar manner, the digital audio circuit 74 outputs subcode data and a digital data stream 78. The digital data stream 76 is illustrated as a sequence of samples from S400-S406 and the digital data stream 78 is illustrated as a sequence of samples S404-S410. It should be understood that the sample S400 and the digital data stream 76 corresponds to frame 400 in track 68. Similarly, each of the samples in digital data stream 78 correspond to the similarly numbered frames in the track 70.

Since the tracks 68 and 70 are scanned at different speeds, there will be delta between corresponding sample frames illustrated in FIG. 3 as, for example, the two frames 400. It is important to note that the present invention does not attempt to directly control the track speeds in order to align samples in the output sampled data. The output data rate for the digital data is controlled by the word clock input to the audio circuit 72 and 74. This is essentially the read clock for the buffer. If this clock were increased in frequency, data would be read out at a faster rate and, likewise, if the frequency were decreased, data would be read out at a slower rate. Therefore, the two word clock inputs to the digital audio circuit 72 and 74 determine the relative occurrence of the respective samples. In the embodiment of FIG. 3, even though the frames are aligned, which can be accomplished by synchronizing the two word clock inputs, there is still a variation between the two digital data streams 76 and 78 of the four samples. As will be described hereinbelow, an important aspect of the present invention is knowledge of the absolute difference between corresponding frames in the tracks of two separate CD players and the ability to align the samples such that they are output on the same edge of the word clock.

Figure 4:
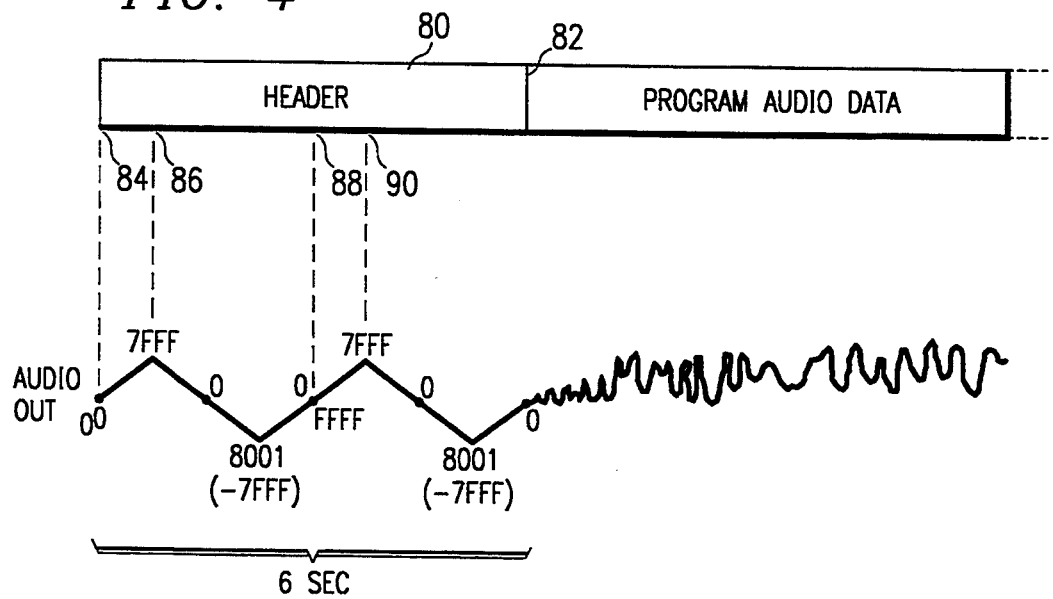
FIG. 4 illustrates the audio signal on the synchronization header of an audio track.

Referring now to FIG. 4, there is illustrated a diagram of the procedure by which information as to the relative sample position between tracks of various CD players are obtained. In the present invention, a header is provided at the beginning of each audio program, an audio program constituting the stream of data from an initiating event to a terminating event. In the preferred embodiment, the present system is utilized in a motion picture environment where the audio program constitutes the audio track for a movie. When the movie initially starts up, there is a pre-determined amount of time for everything to achieve synchronization. During this time, audio information is not required to be output to the sound system associated with the motion picture. Therefore, the CD player is started up and the header information read out.

The header information comprises information as to relative position of the samples in the header 80. The first sample of course would be the sample zero with subsequent samples being incremented by a value of 1. Since all of the compact discs are manufactured and recorded with a known relationship between them, the beginning of the header 80 and the end of the header 80 are known such that the beginning of the audio program and precise frame at which it begins are also known. Consequently, when the ten-thousandth frame on the compact disc track on one player is output as audio data, the corresponding data on another channel in another player also resides on the ten-thousandth frame. Once a base-line is established in each of the CD players, they can be sample aligned such that the ten-thousandth frames on all of the CD players are sampled at the same time.

In the preferred embodiment, the information contained in the header 80 is sampled to determine what sample the CD player is scanning. This information is then stored and a difference value generated between the CD players. Since each of the CD players has the same header associated therewith, a value extracted from one track on one CD player can be subtracted from a value extracted from the header on another track of a second and different CD player to provide the sample difference between the two CD players. During the time that the header is being scanned, these samples are aligned such that when the audio program is initiated at a point 82 on the track, sample alignment has been accomplished.

In the preferred embodiment, the synchronizing information is contained only at the beginning of the track. Once aligned, no further information is provided as to the actual sample number. If a mechanical shock were applied to one of the CDs and for some reason the sample were to shift, no provision in the present embodiment is made for this situation. However, it should be understood that a similar synchronization header could be provided at interspersed areas in the track to again obtain information as to the sample difference between tracks in different CD players. Further, the synchronizing information could be contained on a separate and parallel track that could be scanned continuously.

The header contains audio data that varies upward from a value of zero at the beginning of the header 80, at a point 84. This values ramps up to a maximum value in hexidecimal of 7FFF at a point 86. The digital value of the audio data then ramps down through zero to a hexidecimal value of 8001 which is the negative value of 7FFF at a point 88 on the header 80. The signal then ramps back up to a value of FFFF in hexidecimal at a point 90, which corresponds to a negative one. Therefore, the signal from the point 84 to the point 90 comprises a single cycle in the header 80 which provides information as to the ramp direction and the sample number. This is a unique identifier which provides an output value that can be compared to a corresponding output value from another CD player and a difference determined, this difference directly correlating to the sample difference. Typically, the synchronization procedure takes place during the first cycle of the header 80 and then a second cycle is provided during the remaining portion of the header 80 that is identical to the first cycle to verify that synchronization has in fact been achieved. As will be described hereinbelow, the synchronizing procedure can take up to one second with a total of six seconds provided for the overall length of the header to account for noise and errors. Synchronization is achieved when it is determined that a the sample difference over five successive sample frames has not varied. After it has been determined that a valid sample difference is present, the sample frames are then aligned as will be described hereinbelow. This is then verified during the second half of the header 80. At the end of the header, audio data is then output.

Referring now to FIGS. 5a–5d, the operation of aligning the samples will be described. Generally, a reference clock referred to as the frame clock is established that is comprised of a predetermined number of clock cycles of the word clock, which word clock operates at the sampling frequency. Each cycle of the word clock corresponds to the length of a sample frame. The sample difference between each of the CD players 14–18 and the CD player 12 is determined and then the samples are "slipped" in one direction or the other for each of the CD players 14–18 until they approach a zero value. This slipping procedure entails temporarily increasing the frequency of the word clock or decreasing the frequency of the word clock for CD players 14–18 in such a manner that one sample at a time is slipped during each cycle of the frame clock. This slipping operation occurs in discrete steps, once every 240 cycles of the word clock. It is important that after the slipping operation is achieved, phase lock between the various word clocks is restored, which word clocks are then locked to the word clock of the CD player 12. This slipping operation is achieved by varying the divide ratio in the divide-by-N dividers 48–52.

Figure 5A:
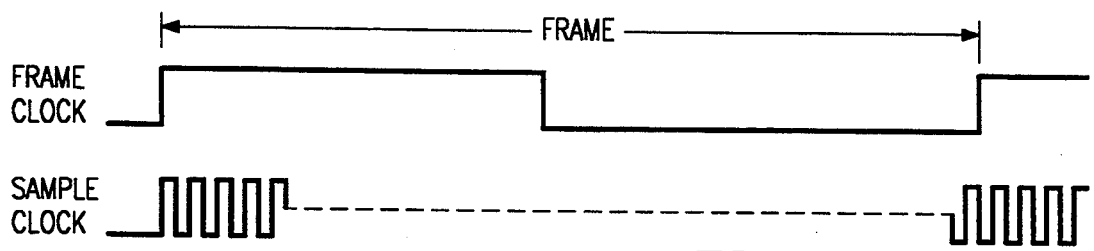
FIGS. 5a-5d illustrate timing diagrams for the frame clock and the sample clock operating during the sample frame adjustment.

Referring now to FIG. 5a, there is illustrated a timing and diagram for the frame clock and the word clock. The frame clock is generated on the output of the divider 42 on line 44, with reference to FIG. 1. One cycle of the frame clock is equal to 240 cycles of the word clock. When the divide-by-N dividers 48–52 are set at a nominal value of 240. This is the resting state for the dividers at sample alignment. The frame clock provides a defined clock edge upon which slipping occurs. If it is necessary to speed the word clock up, an additional cycle is added in the word clock during one cycle of the frame clock by decreasing the divide ratio and, alternatively, the word clock can be slowed down by taking away one cycle of the word clock during one period of the frame clock by decreasing the divide ratio.

Figure 5B:
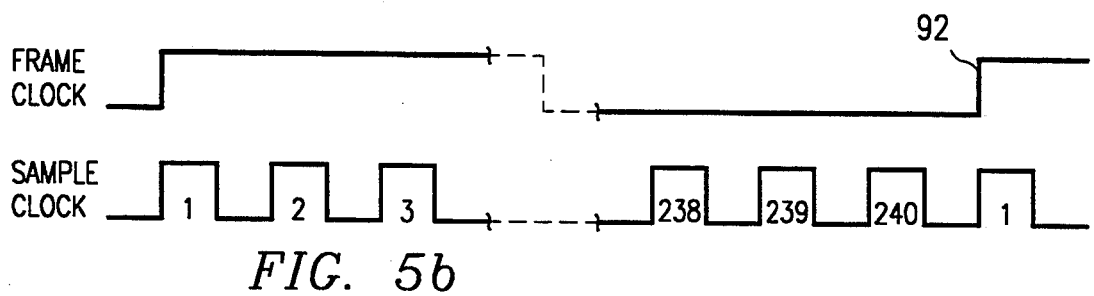

Referring now to FIG. 5b, there is illustrated a detail as to how the cycles of the word clock are sequenced in a given period of the frame clock. The first cycle in the word clock after the rising edge of the frame clock has occurred is given the value "one" and this is sequenced up to a value of 240. At the next rising edge of the frame clock, at an edge 92, the value is reset again to "one" and the value sequence is begun over.

Figure 5C:
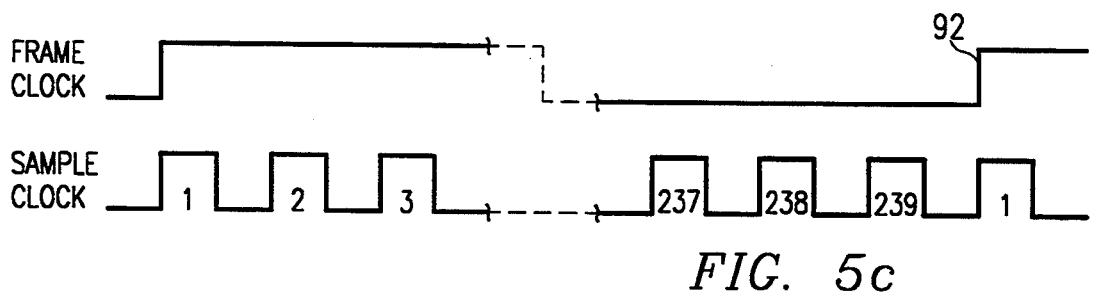

With reference to FIG. 5c, the word clock frequency is decreased by removing one cycle such that only 239 cycles are present during one period of the frame clock. Therefore, at the end of the frame clock, the last cycle of the word clock to occur is the 239th cycle and then the value is reset at the rising edge 92 of the frame clock to a value of "one".

Figure 5D:
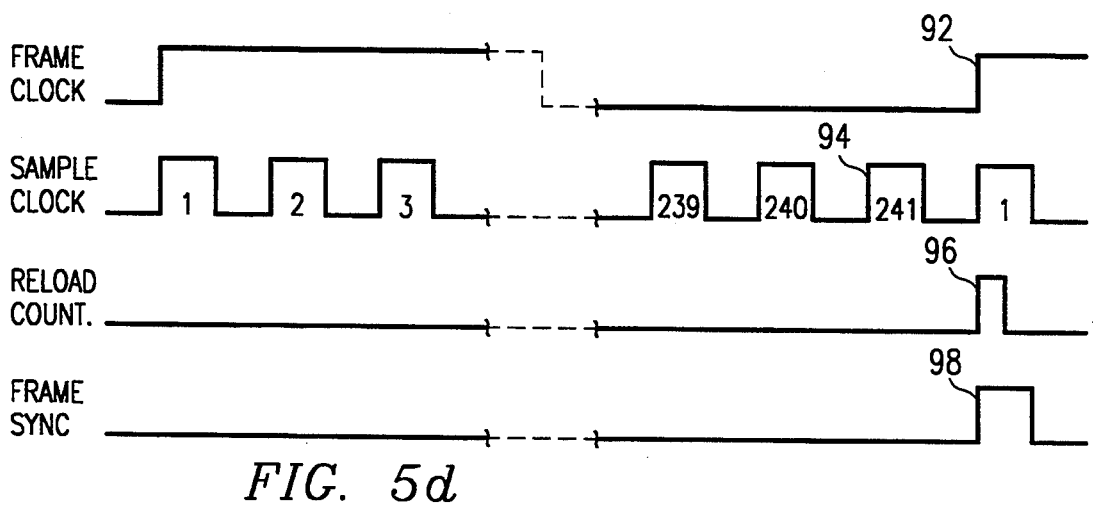

Referring now to FIG. 5d, there is illustrated the situation where the word clock is increased in frequency and an additional cycle added during one period of the frame clock. At the count value of 240, an additional cycle 241 is added at a leading edge 94. At an edge 96, a reload count signal is generated after 241 counts of the word clock have occurred during a given frame clock period. This resets the count value such that the cycle following the edge 94 has a value of "one". This results in a value of one always occurring after the rising edge 92 of the frame clock. At this point, an extra pulse has been slipped in, which pulse corresponds to an extra sample. In addition, a frame sync pulse 98 is provided that ensures that the leading edge of the first cycle of the word clock for each of the CD players is synced to the leading edge 92, the frame clock being common to all word clocks. This ensures that all sample frames will be aligned on the edge thereof.

It has been determined that for each period of the frame clock, one sample can be slipped in either direction, i.e. a pulse can be added or a pulse can subtracted. If more than one pulse were added or subtracted, this would cause too much jitter and cause the clock to become unlocked. Therefore, from an initial starting point with a count value of 240 pulses of the word clock occurring during one cycle of the frame clock, the next cycle could be varied to 239 pulses, the next frame clock cycle could be varied to 238 pulses, the next frame clock cycle varied to a value of 237 pulses, etc.

This would continue for a pre-determined amount of time to speed up the word clock. However, it is necessary to return to a count value of 240 word clock cycles during one period of the frame clock, and, as such, it is necessary to anticipate this and move backwards from a count value of, for example, 235 to 240 at no more than one clock cycle per frame.

If a large sample difference exists, the word clock may require speeding up or slowing down at a rate that may result in the edge of the sample clock not being aligned with the edge of the frame clock at the time that the frame alignment pulse is generated at edge 98. For example, if there were approximately 30 degrees of phase shift at the time of the generation of the sample alignment pulse at edge 98, this would result in the sample clock having a duty cycle of much less than 50%. This could result in a significant amount of phase perturbation, which could cause the clock to break lock.

To prevent the frame alignment pulse from occurring at any point other than the edge of the sample clock, a lookup table is provided, which is illustrated as Table 1.

TABLE 1

| VALUE | FRAMES | SAM/FRAME | RAMP PEAK | RAMP CNT | TOTAL |
|---|---|---|---|---|---|
| 234 | 13 | 78 | 189 | 40 | 1075 |
| 235 | 9 | 45 | 111 | 27 | 875 |
| 236 | 15 | 60 | 66 | 18 | 725 |
| 237 | 1 | 3 | 6 | 3 | 555 |
| 238 | 1 | 2 | 3 | 2 | 362 |
| 239 | 1 | 1 | 1 | 1 | 183 |
| 240 | 0 | 0 | 0 | 0 | 0 |
| 241 | 1 | −1 | −1 | 1 | −182 |
| 242 | 1 | −2 | −3 | 2 | −362 |
| 243 | 1 | −3 | −6 | 3 | −550 |
| 244 | 15 | −60 | −66 | 18 | −737 |

In Table 1, there are six columns, the first column is labeled Value which provides the number N in the divide-by-N divider circuits 48–52 which ranges from a value of 234 to a value of 245 with the value of 240 being nominal. A second column labeled Frames provides the number of 240 sample frames which must pass before the frame alignment pulse can be issued for synchronizing the word clocks to the same standard. A column Sam/Frame provides the net gain or loss (slipped) labeled samples that occur during the cycle defined by the frames, this column representing the accrued samples. A column labeled Ramp Peak provides the total gain or loss of samples which has occurred following Frames cycling to get the offset value of the Value column. Since you must ramp up and then ramp down, this provides the number of frames that will be required to get back to the value of 240 for the divide-by-N value. A column labeled Ramp Cnt provides the number of 240 sample frames utilized to get to the peak. The column Total is the maximum number of samples which can be slipped during a one second period, the value of one second being provided as an arbitrary number over which sample alignment is achieved. If the amount of sample alignment is minimal, the slower that the sample alignment is achieved, the higher the probability that lock will not be broken.

As an example, assume that the sample difference between two tracks is 600. This would require changing the value of N from 240 to 236 in the divide-by-N divider. If, however, the sample difference were in excess of 725 samples, this would require changing the value down to 235. In the ramping procedure, the first frame results in 239 pulses being present with one pulse removed, i.e., one sample has been slipped. In the next frame, the count value is changed to 238, thus resulting in a total of three samples slipped for the first two frames. In the third frame, the count value is changed to 237, resulting in three samples slipped during that frame with a total of six samples slipped in the first three frames. In the fourth frame, the count value is changed to 236 and this count value is maintained for a total of fifteen frames before the next sample frame alignment pulse is generated. For each frame, four samples are slipped but, 60 samples are slipped before the next frame alignment pulse occurs. The value N remains at 236 for between one to 66 cycles of the Frames value, each cycle having fifteen periods of the frame clock associated therewith. At a point in time that corresponds to eighteen periods of the frame clock prior to the end of the procedure, it is necessary to ramp back up from a value of 235 to a value of 240 in the same sequence that it was ramped down. By following this procedure, no more than one count value increment per 240 sample frames occurs and sample alignment does not occur until the edges of all of the samples are substantially aligned, as defined by the master frame clock.

Figure 6:
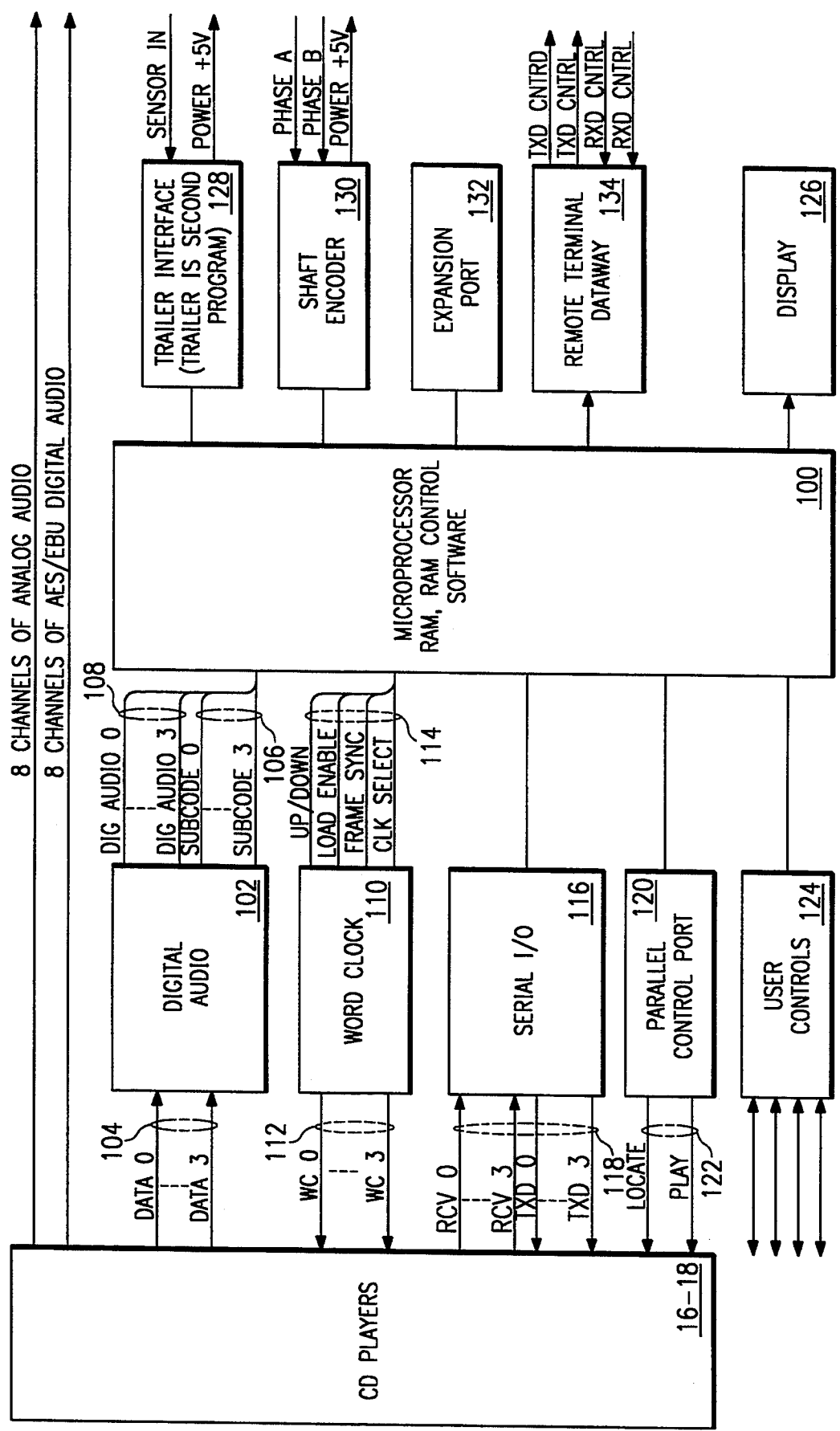
FIG. 6 illustrates a schematic block diagram of the controller.

Referring now to FIG. 6, there is illustrated a schematic block diagram of the controller 20 and the associated circuitry for generating the sampling frequency for each of the CD players 12–18. A block 100 is provided, which block represents the central processing unit that includes a microprocessor, associated Random Access Memory (RAM), Read Only Memory (ROM) and control software. The CPU block 100 is a conventional microprocessor with its associated operating software and memory. The CPU interfaces with a bank of digital audio circuits 102 which include four separate digital audio circuits similar to digital audio circuits 72 and 74 of FIG. 3.

As described with respect to FIG. 3, each of the digital audio circuits is operable to receive data output by the CD players 12–18, which data is modulated, and demodulate the data to process the subcode and digital audio data separately and provide for each CD player 12–18 a separate digital audio output and a subcode output. Each digital audio circuit is comprised of a circuit manufactured by Yamaha, Part No. YM3623B. They are represented by the bank 102. The modulated digital audio data is represented as a group of four data lines 104, labeled DATAA, DATAB, DATAC AND DATAD. The data is demodulated and then each of the digital audio circuits outputs subcode data on one of four lines 106, and the digital audio data on one of four lines 108. These lines are input to CPU 100.

The sampling frequencies are generated by a word clock circuit 110 which outputs on lines 112 four sampling frequencies, these lines 112 corresponding to the sampling frequency lines 22–28 in FIG. 1. The control inputs to the word clock 110 comprise a U/D input for controlling an internal up/down counter, an Enable signal, a Frame Sync signal and a Clock Select signal, the control lines are represented by the group of lines 114.

A communication block 116 provides communication between the CD players 12–18 and the CPU 100 through communication lines 118. A parallel control port 120 is also provided having parallel control lines 122 labeled Locate and Play. A user control block 124 is provided for allowing the user to interface with the CPU 100 in addition to a display 126 which is interfaced with the CPU 100 to write an output to a display.

The CPU 100 also interfaces through a trailer interface 128, which trailer interface allows the CPU 100 to determine whether there is an additional program present. The trailer primarily is a second program in a given production, such as the lead-in commercial, etc. A shaft encoder interface 130 is provided for allowing the system to synchronize with the projector, the input to the shaft encoder 130 comprising a synchronization input. An eight bit expansion port 132 is provided and a remote terminal interface 134 is provided for interfacing with another remote terminal allowing a user to access the various functions of the CPU 100.

Figure 7:
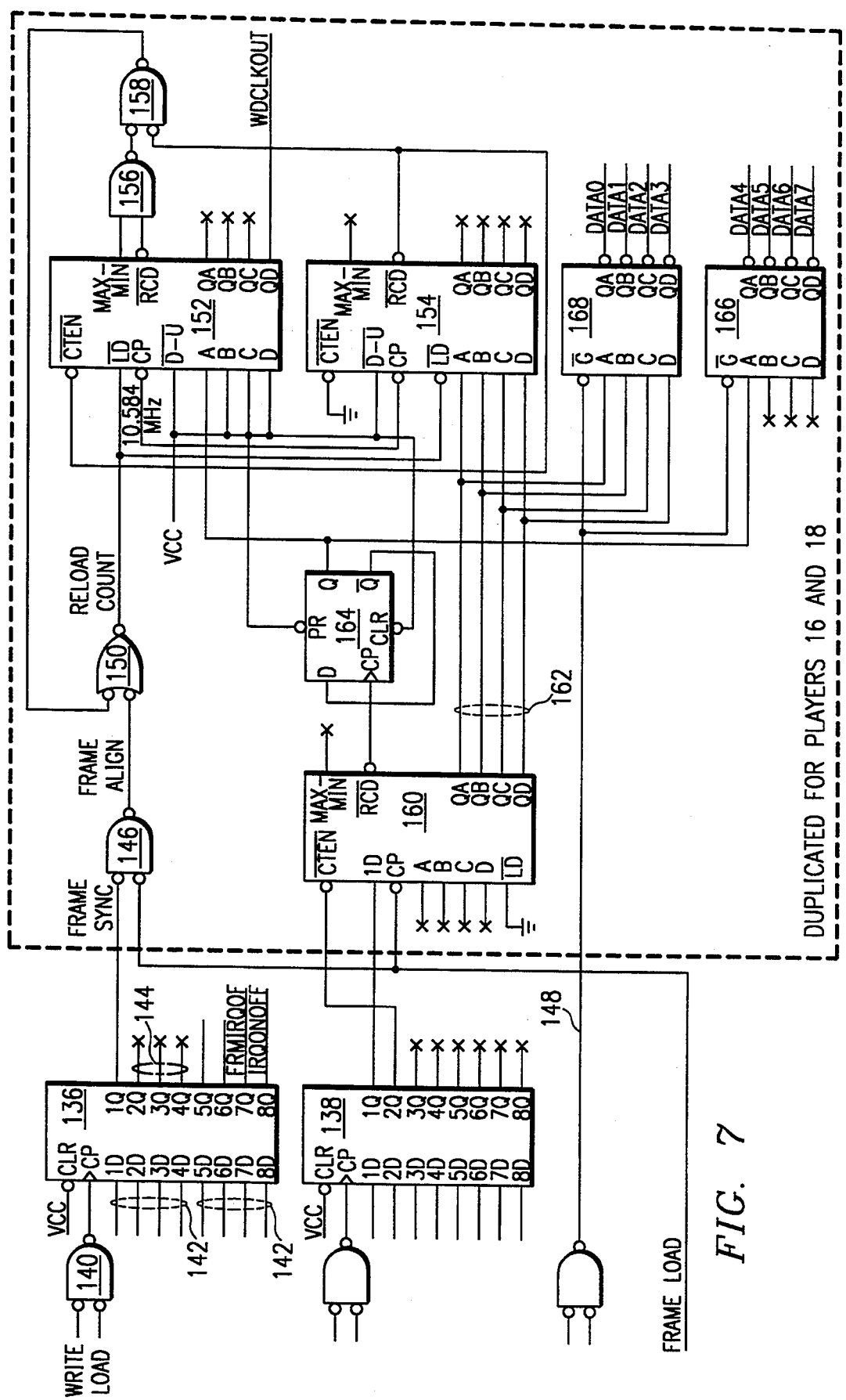
FIG. 7 illustrates a logic diagram of the word clock generator.

Referring now to FIG. 7, there is illustrated a detailed schematic block diagram of the word clock circuit 110 relating to CD players 14–18. Two eight bit data latches 136 and 138 are provided, the latch 136 latching to the frame sync pulses and latch 138 latching through the Write Strobes. The latch 136 is clocked on the output of a two input AND gate 140, the inputs of which are connected to the CPU 100 to provide strobe inputs therefor. The first four data inputs on line 142 provide frame sync inputs, which are output on data output lines 144. For simplicity purposes, only the circuitry connected with the first of the word clock circuits for CD players 14–18 will be illustrated. The frame sync output from the latch 136 is input to a two input NAND gate with inverting inputs 146. The other input of the NAND gate 146 is connected to the frame load 30 signal on a line 148. The frame load line essentially is the rising edge of the frame clock. The frame sync signal ensures that synchronization occurs only on the rising edge of the frame clock. The output of the NAND gate 146 is input to one input of a NOR gate 150 having two inverting inputs. The output of the NOR gate 150 provides a Reload Count. The output of NOR gate 150 is input to the reset input of the divide-by-N counter. The divide-by-N counter is comprised of two four bit counters 152 and 154. The QD output of counter 152 provides the word clock output for the associated CD player.

The ripple clock output of counter 152 is input to one input of a two input NAND gate 156, the other input of which is connected to the MAX-MIN output. The output of NAND gate 156 is input to one input of a two input NAND gate 158. The other inverting input of NAND gate 158 is connected to the ripple clock output of counter 154. The ripple clock output of counter 154 is also input to the Enable input of counter 152. The output of NAND gate 158 provides the other input for the NOR gate 150, this output indicating when the counter overflows at its maximum count. The Reload Count output of NOR gate 150 is connected to the Load input of the two counters 152 and 154. The clock inputs thereof are connected to the output of multiplier 40.

The divide-by-N counter counts to a maximum count value which is determined by the data input labeled "A" on counter 154 and the data inputs to counter 152. The remaining three inputs on counter 152 are tied to a positive voltage. In operation, whenever a frame align pulse is received on the output of NAND gate 146 or the counters have hit their maximum count value, the reload count signal is generated. The frame align pulse, as described above, sets the counters such that they initiate their counting at the edge of the frame clock. Since the frame clock is common to all four word clock outputs, this will provide perfect sample alignment. However, there are certain times when the divide-by-N counter is allowed to cycle for multiple frames before it is frame aligned.

An up/down counter 160 is provided which has the enable input connected to one output of the data latch 138 and the U/D control input connected to another output of the latch 138. The clock input to the counter 160 is connected to the frame load signal on line 148. The four outputs of the counter 160 are output to lines 162 for input to the four data inputs of counter 154. The ripple clock output of counter 160 is input to a D-type flip flop 164, the output of which is input to the A-input of the counter 152. This provides a five bit count function. The counter 160 and the counters 152 and 154 are all similar devices of the type 74LS191, with the direction control on the counters 152 and 154 connected to the positive voltage.

In operation, the up/down counter 160 has a control signal generated by the CPU 100 to determine whether the count is to be incremented or decremented. The initial value is loaded by the CPU 100 and the count value incremented by the frame load on the positive edge thereof. However, the enable signal can prevent incrementing or decrementing of the counter on the frame load edge. This was described above with reference to Table 1 wherein the count value may be held for a predetermined number of frames. The CPU 100 interfaces with the output count value from the counter 160 and flip flop 164 through buffer circuits 166 and 168. This allows CPU 100 to monitor the count value on the output thereof and thereby adjust the value.

Figure 8:
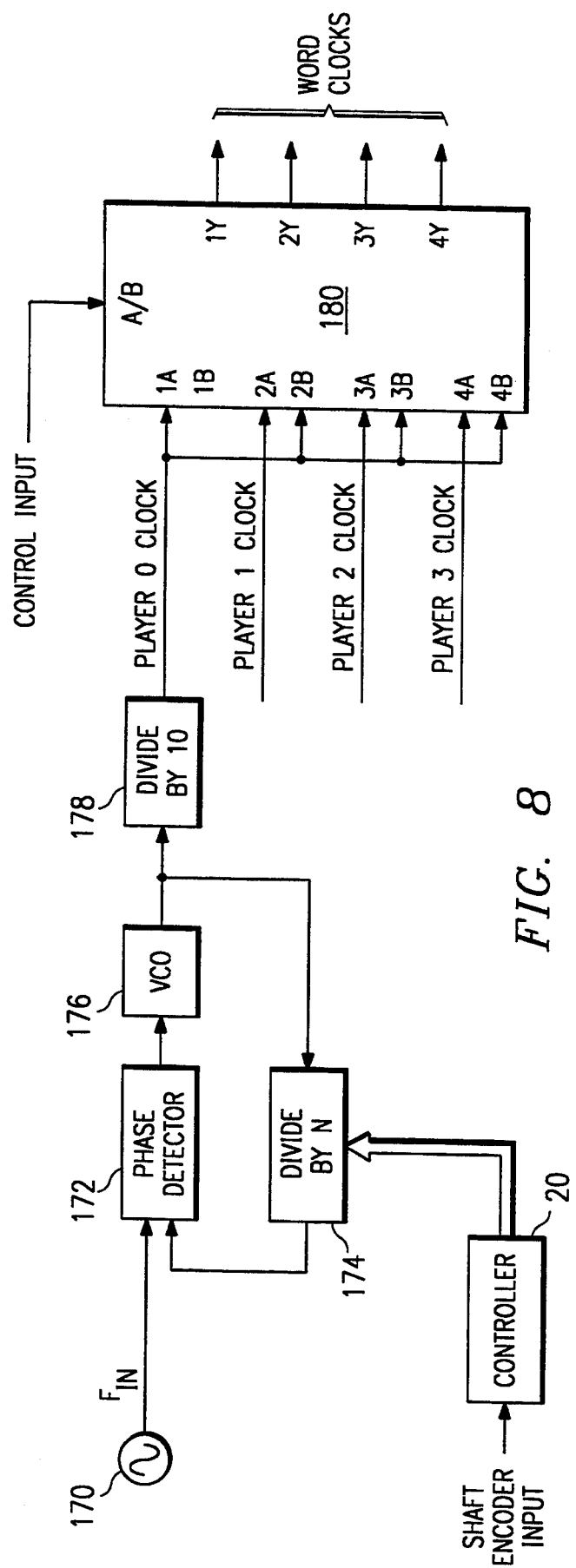
FIG. 8 illustrates a logic diagram of the high resolution clock.

Referring now to FIG. 8, there is illustrated a logic diagram for the portion of the word clock circuit 110 for generating the high resolution 44.1 kHz clock as the word clock input to the CD player 12. A reference frequency $F_{IN}$ is generated in a clock 170. This reference frequency is input to a phase detector 172, the other input of which is connected to the output of a divide-by-N circuit 174. The output of the phase detector 172 is input to the control input of a VCO 176, the output of which provides the input to the divide-by-N circuit 174. The VCO 176 operates at a frequency of 441.0 kHz, with the VCO 176, the phase detector 172 and the divide-by-N circuit 174 forming a phase lock loop.

The output of the VCO 176 is input to a divide-by-ten circuit 178 to provide on the output thereof the 44.1 kHz word clock frequency. This clock frequency is input to the "1A" input of an A/B switch 180 and also to the "1B" input thereof. The outputs of dividers 48–52 are input to the "2A", "3A", and "4A" inputs, respectively, of switch 180. The "2B", "3B", and "4B" inputs are connected to the output of the divider 178. The switch control input of switch is connected to a control signal from controller 20. The "Y" outputs of switch 180 provide the word clock inputs to the CD players 12–18. The switch 180 corresponds to the switches 49,51 and 53.

In operation, the switch 180 is configured in the "A" position during sample alignment and in the "B" position once sample alignment has been achieved. Therefore, during sample alignment, CD players 14–18 have the word clock inputs thereof connected to the outputs of the respective dividers 48–52, and after alignment, the work clock inputs are connected to the high resolution 44.1 kHz clock. As described above, sample alignment is achieved during the first six seconds that the header 80 is present. The controller 20 is operable to determine when sample alignment has been achieved and then operate all the word clocks off of the single high resolution clock.

By operating all of the word clocks from a single high resolution clock, it is possible to then vary only one clock and provide an overall adjustment to the rate at which samples are output by the CD players 12-18. This is important when synchronizing with the projection system. The divider 174 is controlled by the controller 20 to operate at a predetermined divide ratio during sample alignment. After sample alignment, the controller 20 receives the shaft encoder input and determines if the word clock needs to be increased or decreased in frequency to provide proper synchronization with the projection system. The controller 20 makes this determination by counting the pulses at the shaft encoder input and comparing this count value with a corresponding count of the subcode data frames. This provides synchronization of the sound track with the picture.

In summary, there has been provided a method and apparatus for synchronizing multiple CD players together. Each of the CD players is controlled by an external word clock such that the output data rate of the audio data is externally determined. Each of the word clock inputs has the frequency thereof varied to maintain sample alignment on the output. A baseline reference is determined by reading a unique sequence of values off of the individual discs in the CD players to determine the absolute number of the sample being scanned. After the absolute number has been determined, a difference is calculated between all of the CD players and then the samples aligned by increasing or decreasing the frequency of the word clocks, which word clocks are referenced to a master clock. Although the preferred embodiment has been described in detail, it should be understood that various changes, substitutions and alterations can be made therein without departing from the spirit and scope of the invention as defined by the appended claims.

What is claimed is:

1. A compact disc, comprising:

a plurality of sample frames arranged on a spiraling track on a surface, each of the sample frames containing digital data in the form of a digital data stream; and a synchronization section contained in said spiraling track and comprising a portion of said digital data stream, said synchronization section containing at least one of said sample frames, the data contained in said at least one sample frame including synchronizing data that is operable to provide the relative position of said at least one sample frame to the positions of each of said sample frames in said digital data stream in said spiraling track, each of said sample frames in said spiraling track having a position associated therewith relative to said digital data stream and extending from a first position to an nth position.

2. The compact disc of claim 1 wherein said synchronization section contains a plurality of said sample frames.

3. The compact disc of claim 1 wherein said synchronization section is disposed at the beginning of said spiraling track.

* * * * *